US009503723B2

(12) United States Patent
Gu et al.

(10) Patent No.: US 9,503,723 B2
(45) Date of Patent: Nov. 22, 2016

(54) METHOD AND APPARATUS OF DEPTH PREDICTION MODE SELECTION

(71) Applicants: Futurewei Technologies Co., Ltd., Plano, TX (US); Santa Clara University, Santa Clara, CA (US)

(72) Inventors: Zhouye Gu, Santa Clara, CA (US); Jianhua Zheng, Beijing (CN);
(Continued)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 307 days.

(21) Appl. No.: 14/152,904

(22) Filed: Jan. 10, 2014

(65) Prior Publication Data

US 2014/0198179 A1    Jul. 17, 2014

Related U.S. Application Data

(60) Provisional application No. 61/751,589, filed on Jan. 11, 2013.

(51) Int. Cl.
*H04N 19/597* (2014.01)
*H04N 19/176* (2014.01)
(Continued)

(52) U.S. Cl.
CPC ........ *H04N 19/00769* (2013.01); *H04N 19/11* (2014.11); *H04N 19/147* (2014.11); *H04N 19/176* (2014.11); *H04N 19/597* (2014.11)

(58) Field of Classification Search
CPC .................. H04N 19/597; H04N 19/46; H04N 19/176; H04N 19/1887; H04N 19/619;
(Continued)

(56) References Cited

U.S. PATENT DOCUMENTS 5,764,167 A    6/1998 Adams et al.
7,577,305 B2 *  8/2009 Srinivasan ........... H04N 19/136
382/233
(Continued)

FOREIGN PATENT DOCUMENTS

WO    2013068567 A1    5/2003
WO    2013028121 A1    2/2013
(Continued)

OTHER PUBLICATIONS

"Model Based Intra Coding for Depth Maps in 3D Video Using Depth Lookup Table" by Fabian Jager et al., (hereinafter Jager) 3DTV Conference DOI 10-11093DTV-2012.6365477, Dec. 2011.*
(Continued)

*Primary Examiner* — Chikaodili E Anyikire
*Assistant Examiner* — Dramos I Kalapodas
(74) *Attorney, Agent, or Firm* — Futurewei Technologies, Inc.

(57) ABSTRACT

There is disclosed a method, apparatus and computer program product for prediction mode selection for coding a block of a depth map. An ordered list of coding modes is obtained, wherein the ordered list of coding modes comprises a plurality of coding modes each of which is capable of being used for coding of the block. A plurality of depth modeling modes (DMMs) each of which is capable of being used for coding of the block are obtained. And whether a DMM of the plurality of DMMs is to be added into the ordered list of coding modes in accordance with a decision condition is determined.

15 Claims, 7 Drawing Sheets

(72) Inventors: Nam Ling, San Jose, CA (US); Philipp Zhang, Plano, TX (US)

(51) Int. Cl.
*H04N 19/147* (2014.01)
*H04N 19/11* (2014.01)
*H04N 19/14* (2014.01)

(58) Field of Classification Search
CPC .......... H04N 19/43; H04N 19/593; H04N 19/55; H04N 19/44; H04N 19/70; H04N 19/147; H04N 19/11; H04N 19/00769; H04N 13/00; H04N 19/103; H04N 19/19; H04N 19/197; H04N 19/196
See application file for complete search history.

(56) References Cited

U.S. PATENT DOCUMENTS

| | | | |
|---|---|---|---|
| 8,165,617 | B2 | 4/2012 | Abe et al. |
| 8,224,100 | B2 | 7/2012 | Jeong |
| 8,406,286 | B2 * | 3/2013 | Liu ............................. 375/240 |
| 2006/0031779 | A1 | 2/2006 | Theurer et al. |
| 2007/0071105 | A1 | 3/2007 | Tian et al. |
| 2009/0074058 | A1 | 3/2009 | Zhang et al. |
| 2009/0116732 | A1 | 5/2009 | Zhou et al. |
| 2009/0235170 | A1 | 9/2009 | Golden et al. |
| 2010/0046628 | A1 | 2/2010 | Bhaskaran et al. |
| 2011/0150433 | A1 | 6/2011 | Alexandrov et al. |
| 2011/0173256 | A1 | 7/2011 | Khalatian |
| 2011/0202854 | A1 | 8/2011 | Chan et al. |
| 2011/0261883 | A1 | 10/2011 | Bang et al. |
| 2011/0317757 | A1 * | 12/2011 | Coban ................ H04N 19/197 375/240.02 |
| 2012/0008675 | A1 | 1/2012 | Karczewicz et al. |
| 2012/0082210 | A1 | 4/2012 | Chien et al. |
| 2012/0133727 | A1 | 5/2012 | Bolduc et al. |
| 2012/0177118 | A1 | 7/2012 | Karczewicz et al. |
| 2012/0183066 | A1 * | 7/2012 | Oh ...................... H04N 19/132 375/240.13 |
| 2012/0320974 | A1 | 12/2012 | Li et al. |
| 2012/0327999 | A1 | 12/2012 | Francois et al. |
| 2013/0002816 | A1 | 1/2013 | Hannuksela et al. |
| 2013/0176389 | A1 * | 7/2013 | Chen ..................... H04N 19/597 348/43 |
| 2013/0188717 | A1 | 7/2013 | Chen et al. |
| 2013/0188718 | A1 | 7/2013 | Chen et al. |
| 2013/0188719 | A1 | 7/2013 | Chen et al. |
| 2013/0229485 | A1 | 9/2013 | Rusanovskyy et al. |
| 2013/0265388 | A1 * | 10/2013 | Zhang ................ H04N 13/0048 348/43 |
| 2013/0266064 | A1 * | 10/2013 | Zhang ..................... H04N 19/50 375/240.12 |
| 2013/0272385 | A1 | 10/2013 | Yu et al. |
| 2013/0279576 | A1 | 10/2013 | Chen et al. |
| 2013/0287093 | A1 | 10/2013 | Hannuksela et al. |
| 2013/0301725 | A1 * | 11/2013 | Wang ................... H04N 19/597 375/240.16 |
| 2014/0133558 | A1 * | 5/2014 | Seregin ................ H04N 19/105 375/240.12 |
| 2014/0247871 | A1 * | 9/2014 | Merkle ............ H04N 19/00533 375/240.12 |
| 2014/0341290 | A1 * | 11/2014 | Merkle .................. H04N 19/52 375/240.16 |
| 2015/0124867 | A1 * | 5/2015 | Jaeger .................. H04N 19/597 375/240.02 |
| 2015/0245061 | A1 * | 8/2015 | Chen .................... H04N 19/597 375/240.13 |

FOREIGN PATENT DOCUMENTS

| | | |
|---|---|---|
| WO | 2013068562 A1 | 5/2013 |
| WO | 2013113134 A1 | 8/2013 |
| WO | 2013156678 A1 | 10/2013 |
| WO | 2013159330 A1 | 10/2013 |

OTHER PUBLICATIONS

"Test Model Under Consideration for HEVC Based 3D Video Coding", by Heiko Schwarz et al., (hereinafter Schwarz) ISO/IEC JTC1/SC29/WG11 MPEG2011/N12559, Feb. 2012.*
G. J. Sullivan, J.R. Ohm, W.-J.Han and T. Wiegand: "Overview of the High Efficiency Video Coding (HEVC) Standard", IEEE Trans. Circ. Sys. Video Tech. (22), No. 12, pp. 1649-1668, Dec. 2012.
Lainema, J.; Bossen, F.; Han, W.-J.; Min, J.; Ugur, K., "Intra Coding of the HEVC Standard," IEEE Transactions on Circuits and Systems for Video Technology, vol. 22, No. 12, pp. 1792-1801, Dec. 2012.
G. Tech, K. Wegner, Y. Chen, S. Yea "3D-HEVC Test Model 2" in JCT3V-B1005, Shanghai, China, pp. 118, Dec. 23, 2012.
XP030111462. Zhang X et al: "Non-CE6: Intra mode coding with fixed length binarization",JCTVC-H0435, Jan. 21, 2012. total 6 pages.
XP030111202. Frana Prg Ois E et al: "Non-CE6c: Adaptations of intra mode coding",JCTVC-H0175, Jan. 20, 2012. total 8 pages.
XP030130606. Gu(Scu) Z et al: "3D-CE6.h related: Fast DMM Selection for Depth Intra Coding",JCT3V-00190, Jan. 12, 2013. total 4 pages.
XP032494540. Zhouye Gu et al: "Fast Depth Modeling Mode selection for 3D HEVC depth intra coding", Jul. 15, 2013. total 4 pages.

* cited by examiner

| DMM | DMM to be added | Condition to add a DMM to a Full-RD Search List | Condition |
|---|---|---|---|
| Mode 1 with a delta CPV | DMM_WEDGE_FULL_D_IDX | uiRdModeList[0] != 0 | The first mode is not a planar mode |
| Mode 2 without a delta CPV | DMM_WEDGE_PREDDIR_IDX | uiRdModeList[0] != 0 && uiWidth > 4 | The first mode is not a planar mode and a width of a CU is larger than 4 |
| Mode 2 with a delta CPV | DMM_WEDGE_PREDDIR_D_IDX | | |
| Mode 3 without a delta CPV | DMM_WEDGE_PREDTEX_IDX | uiRdModeList[0] != 0 | The first mode is not a planar mode |
| Mode 4 without a delta CPV | DMM_CONTOUR_PREDTEX_IDX | uiRdModeList[0] != 0 && uiWidth > 4 | The first mode is not a planar mode and a width of a CU is larger than 4 |
| Mode 4 with a delta CPV | DMM_CONTOUR_PREDTEX_D_IDX | | |
| Mode 1 without a delta CPV | DMM_WEDGE_FULL_IDX | uiRdModeList[0] != 0 \|\| uiRdModeList[1] == 1 | The first mode is not a planar mode and/or the second mode is a DC mode |
| Mode 3 with a delta CPV | DMM_WEDGE_PREDTEX_D_IDX | | |

FIG. 6

| | video 0 | video 1 | video 2 | video only synthesized only | coded & synthesized | enc time | dec time | ren time |
|---|---|---|---|---|---|---|---|---|
| Balloons | 0.0% | 0.0% | 0.0% | 0.0% | 0.3% | 0.2% | 86.2% | 99.0% | 98.1% |
| Kendo | 0.0% | 0.0% | 0.0% | 0.0% | 0.2% | 0.1% | 83.4% | 97.2% | 104.0% |
| Newspapercc | 0.0% | 0.0% | 0.0% | 0.0% | 0.3% | 0.2% | 86.7% | 100.1% | 98.5% |
| GhostTownFly | 0.0% | 0.0% | 0.0% | 0.0% | 0.2% | 0.2% | 84.9% | 96.9% | 100.1% |
| PoznanHall2 | 0.0% | 0.0% | 0.0% | 0.0% | 0.3% | 0.2% | 85.9% | 99.1% | 100.2% |
| PoznanStreet | 0.0% | 0.0% | 0.0% | 0.0% | 0.1% | 0.1% | 83.8% | 99.1% | 98.4% |
| UndoDancer | 0.0% | 0.0% | 0.0% | 0.0% | 0.1% | 0.1% | 85.0% | 98.8% | 99.1% |
| 1024x768 | 0.0% | 0.0% | 0.0% | 0.0% | 0.2% | 0.2% | 85.4% | 98.7% | 100.2% |
| 1920x1088 | 0.0% | 0.0% | 0.0% | 0.0% | 0.2% | 0.1% | 84.9% | 98.5% | 99.5% |
| average | 0.0% | 0.0% | 0.0% | 0.0% | 0.2% | 0.1% | 85.1% | 98.6% | 99.8% |

*FIG. 7*

United States Patent 9,503,723 B2

METHOD AND APPARATUS OF DEPTH PREDICTION MODE SELECTION

CROSS-REFERENCE TO RELATED APPLICATIONS

The present application claims priority to U.S. Provisional Patent Application No. 61/751,589 filed on Jan. 11, 2013 by Zhouye Gu et al. and entitled "Method of Low Complexity Depth Intra Coding", which is incorporated herein by reference as if reproduced in its entirety.

TECHNICAL FIELD

The present application relates generally to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard H.264/AVC or the Multiview Video Coding MVC extension of H.264/AVC, High Efficiency Video Coding standard HEVC or Multiview extension of HEVC plus depth, or 3D extension of HEVC may be used.

SUMMARY

According to a first embodiment, there is provided a method of prediction mode selection for coding a block of a depth map, the method comprising:

obtaining an ordered list of coding modes, wherein the ordered list of coding modes comprises a plurality of coding modes which is capable of being used for coding of the block;

obtaining a plurality of depth modeling modes (DMMs) which is capable of being used for coding of the block; and determining whether a DMM of the plurality of DMMs is to be added into the ordered list of coding modes in accordance with a decision condition According to a second embodiment, there is provided an apparatus, comprising at least one processor and at least one memory including computer program code, the at least one memory and the computer program code configured to, with the at least one processor, cause the apparatus to:

obtain an ordered list of coding modes, wherein the ordered list of coding modes comprises a plurality of coding modes each of which is capable of being used for coding of a block of a depth map;

obtain a plurality of depth modeling modes (DMMs) each of which is capable of being used for coding of the block; and determine whether a DMM of the plurality of DMMs is to be added into the ordered list of coding modes in accordance with a decision condition.

According to a third embodiment, there is provided an apparatus, comprising:

means for obtaining an ordered list of coding modes, wherein the ordered list of coding modes comprises a plurality of coding modes each of which is capable of being used for coding of a block of a depth map;

means for obtaining a plurality of depth modeling modes (DMMs) each of which is capable of being used for coding of the block; and means for determining whether a DMM of the plurality of DMMs is to be added into the ordered list of coding modes in accordance with a decision condition.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 illustrates other embodiments of decision conditions applied in embodiments of a mode selection.

FIG. 7 illustrates an experimental result of another embodiment of a mode selection method.

DETAILED DESCRIPTION

Figure 1:
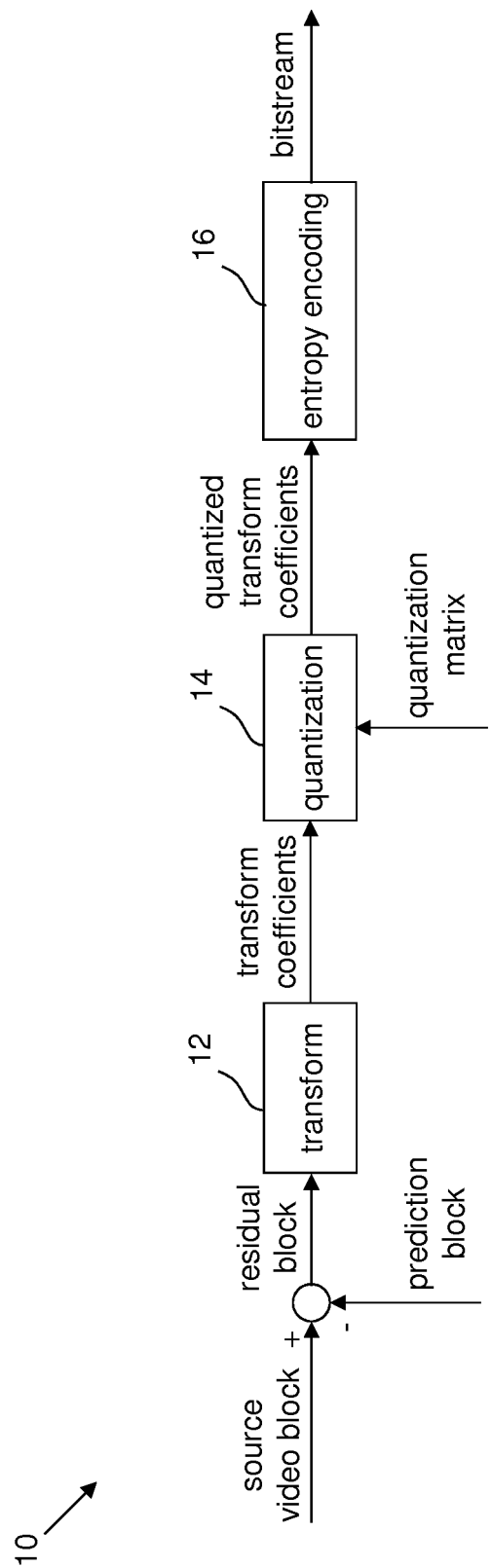
FIG. 1 illustrates part of an exemplary video encoder.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following, several embodiments of the invention will be described in the context of one video coding arrangement. It is to be noted, however, that the invention is not limited to this particular arrangement. In fact, the different embodiments have applications widely in any environment where improvement of reference picture handling is required. For example, the invention may be applicable to video coding systems like streaming systems, DVD players, digital television receivers, personal video recorders, systems and computer programs on personal computers, hand-held computers and communication devices, as well as network elements such as transcoders and cloud computing arrangements where video data is handled.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

There is a currently ongoing standardization project of High Efficiency Video Coding (HEVC) by the Joint Collaborative Team-Video Coding (JCT-VC) of VCEG and MPEG. For a detailed overview of the HEVC standard, reference is made to an Institute of Electrical and Electronics Engineers (IEEE) paper titled "Overview of the High Efficiency Video Coding (HEVC) Standard" which is accessible from IEEE website (http://ieeexplore.ieee.org/Xplore/home.jsp) with the Digital Object Identifier "10.1109/TCSVT.2012.2221191". This IEEE paper is incorporated herein by reference as if reproduced in its entirety.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. In H.264/AVC and HEVC, a picture may either be a frame or a field. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In a draft HEVC standard, video pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can further be split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signalled in the bitstream allowing the decoder to reproduce the intended structure of these units.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice consists of an integer number of CUs. The CUs are scanned in the raster scan order of LCUs within tiles or within a picture, if tiles are not in use. Within an LCU, the CUs have a specific scan order.

In a Working Draft (WD) 5 of HEVC, some key definitions and concepts for picture partitioning are defined as follows. A partitioning is defined as the division of a set into subsets such that each element of the set is in exactly one of the subsets.

A basic coding unit in a HEVC WD5 is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

In a draft HEVC, there is also a third type of parameter sets, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS.

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set. In a HEVC standard, a slice header additionally contains an APS identifier. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. The NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

An Exemplary Video Encoder

When coding a block of pixels in a picture or video frame, a prediction block may be generated based on one or more previously coded reference blocks using either inter prediction or intra prediction. The prediction block may be an estimated version of the original block. A residual block may be generated by subtracting the original block from the prediction block, or vice versa, which may represent prediction residuals or errors. Since an amount of data needed to represent the prediction residuals may typically be less than an amount of data needed to represent the original block, the residual block may be encoded to achieve a higher compression ratio.

Then, residual values of the residual block in a spatial domain may be converted to transform coefficients in a frequency domain. The conversion may be realized through a two-dimensional transform, e.g. a transform that closely resemble discrete cosine transform (DCT). In a transform matrix, low-index transform coefficients (e.g., located in a top-left region) may correspond to big spatial features and have relatively high magnitudes, while high-index transform coefficients (e.g., located in a bottom-right region) may correspond to small spatial features and have relatively small magnitudes. Further, a quantization matrix (QM) comprising quantization coefficients may be applied to the transform matrix, thereby quantizing all transform coefficients to become quantized transform coefficients. As a result of quantization, the scale or magnitude of transform coefficients may be reduced. Some high-index transform coefficients may be reduced to zero, which may then be skipped in subsequent scanning and coding steps.

FIG. 1 illustrates part of an exemplary video encoder 10 comprising a transform unit or module 12, a quantization module 14, and an entropy encoder or encoding module 16. Although not shown in FIG. 1, it should be understood that other modules, such as prediction module, dequantization module, reconstruction module, etc., may also be present in the video encoder 10. In operation, the video encoder 10 may obtain or acquire a source picture or video frame, which may contain multiple video blocks. In the interest of clarity, the encoding of one source video block is considered here as an example. To encode the video block, a prediction block may first be generated as an estimation of the video block. Recall that the prediction block may be generated via inter or intra prediction by a prediction module. Then, a difference between the source video block and the prediction block may be computed to generate a residual block. The residual block may be transformed by the transform module 12 into transform coefficients. During transform, residual pixel values in a spatial domain, which comprises big features and small features, are converted to transform coefficients in a frequency domain, which comprises high frequency bands and low frequency bands. Afterwards, the quantization module may use a QM to quantize the transform coefficients, thereby generating quantized transform coefficients. Further, the quantized transform coefficients may be encoded by the entropy encoding module and eventually transmitted from the video encoder 10 as part of a bitstream.

A decoder may operate in a similar manner but at least partly in a reversed order.

Intra Prediction Mode Coding

Intra prediction mode coding in HEVC is described in detail in an IEEE paper titled "Intra Coding of the HEVC Standard" which is accessible from IEEE website with the Digital Object Identifier "10.1109/TCSVT.2012.2221525". This IEEE paper is incorporated herein by reference as if reproduced in its entirety.

The coding structure utilized for intra coding in HEVC follows closely the overall architecture of the codec. Images are split into segments called coding units (CU), prediction units (PU), and transform units (TU). CU represent quadtree split regions that are used to separate the intra and inter coded blocks. Inside a CU, multiple nonoverlapping PU can be defined, each of which specifies a region with individual prediction parameters. CU is further split into a quadtree of transform units, each TU having a possibility of applying residual coding with a transform of the size of the TU.

A draft HEVC introduces 33 angular prediction modes (Modes 2 to 34) in addition to planar (Mode 0) and DC (Mode 1) modes for intra coding. Due to increased number of modes (35), efficient coding of intra prediction mode is achieved by using a list based approach. For each prediction unit, the most probable 3 modes are determined and a Most Probable Mode (MPM) list is constructed from these modes. The most probable modes are selected among the intra prediction modes of the neighbouring PUs, more specifically the left and the above neighbours. In order to avoid duplicates in the list, left and above neighbour's intra prediction modes are compared. If the two modes are the same and equal to either Planar or DC modes, then the list is constructed as Planar, DC and Angular (Mode 26—Vertical) in order. If the two modes are the same and equal to an angular mode, then the list is constructed by this mode and two angular modes that are closest to it. If the intra prediction modes of the left and above neighbours are different from each other, they are inserted in the list and the third mode is set as Planar, DC or Angular (Mode 26—Vertical) in the mentioned order.

After determining the prediction mode of the current PU, the encoder checks whether this prediction mode is available in the MPM list. If so, only the index in the list is signaled. Otherwise, the current prediction mode is signaled after a fixed length binarization and bypass coding. There are 32 modes outside the MPM list which can be represented by 5 bits properly. Coding of luma intra prediction mode consists of three syntax elements, namely prev.intra. luma. pred.flag, mpm.idx and rem.intra.luma.pred.mode. The syntax element prey. intra.luma.pred.flag indicates whether the current prediction mode is in the MPM list or not. When this flag is equal to 0, the syntax element rem.intra.luma.pred.mode is coded indicating the prediction mode. When the flag is equal to 1, then the syntax element mpm.idx is coded from which the decoder can get the current intra prediction mode by constructing the MPM list.

While an increase in the number of intra prediction modes can provide substantial performance gains, it also makes the rate-distortion (RD) optimization process more complex. An encoding algorithm utilized by an official HEVC Test Model (HM) 6.0 reference software is described here.

The encoding algorithm of HM software includes two phases. In the first phase, the N most promising candidate modes are selected by the rough mode decision process. In this process, all candidates (35 modes) are evaluated with respect to the following cost function:

$$C = D_{Had} + \lambda \cdot R_{mode}$$

where the $D_{Had}$ represents the absolute sum of Hadamard transformed residual signal for a PU and $R_{mode}$ represents the number of bits for the prediction mode.

In the second stage, the full RD costs with reconstructed residual signal used for actual encoding process are compared among the N best candidates. The prediction mode with the minimum RD cost is selected as the final prediction mode. The number N is varied depending on the PU size. The N is set to {8, 8, 3, 3, 3} for 4×4, 8×8, 16×16, 32×32, and 64×64 PU, respectively, to allow more thorough search for the small block sizes most critical to the joint optimization of prediction and residual data. It is noted that the size of TU may be assumed to be equal to the maximum possible value rather than allowing the TU splitting in this stage for minimizing the complexity. RD optimized TU structure is determined after the second stage by using the best prediction mode.

HEVC-Based Three-Dimensional (3D) Video Coding

The following MPEG document (MPEG number m27310) is incorporated herein by reference as if reproduced in its entirety: G. Tech, K. Wegner, Y. Chen, S. Yea "3D-HEVC Test Model 2" in JCT3V-B1005, Shanghai, China, Dec. 23, 2012. This document is accessible via the following URL: http://phenix.it-sudparis.eu/jct3v/doc_end_user/current_document.php?id=460.

Several 3D video coding standards are currently developed by the Joint Collaborative Team on 3D Video Extension Development (JCT-3V), a joint working group of ISO/IEC MPEG and ITU-T VCEG. To support advanced applications and displays with wider range and continuous view adaptation, efficient compression of video texture and depth data is targeted.

3D video is intended to support 3D video applications, where 3D depth perception of a visual scene is provided by a 3D display system. There are many types of 3D display systems including classic stereo systems which require special-purpose glasses, to more sophisticated multiview auto-stereoscopic displays that do not require glasses, up to holographic displays which provide a large continuum of views from various directions. In more advanced displays, it is desirable or even required to adjust depth perception by automatic means or through an interaction with the end user. As a consequence, the data throughput relative to conventional stereo displays becomes much larger, since the 3D impression is achieved by essentially emitting multiple complete video sample arrays in order to form view-dependent pictures. This puts additional challenges to representation formats and compression, which should deliver high quality data with as small amount of bits as possible. One key method to achieve this is the usage of depth or disparity data along with the video texture, which can then be used to generate additional views by synthesis methods known as image based rendering. In advanced methods, depth maps and their coherency with the video texture can further be exploited for a more compact representation of the overall 3D video.

JCT-3V is performing development study of two 3D video solutions that are using the HEVC coding technology. The first is a multi-view extension of HEVC, so called MV-HEVC and another is a depth enhanced HEVC-based full 3D video codec, 3D-HEVC.

With the advancement of ultra-high definition (UHD) display technology and the capability to present stereoscopic views with higher resolution, the demand for higher compression capability is again expected to arise together with advanced display features supported by depth maps. Therefore, joint compression of video texture and depth maps is becoming even more attractive, which is currently explored in JCT-3V by an extended codec concept nicknamed as 3D-HEVC.

The 3D-HEVC design exploits inter-component dependencies between texture and depth and introduces joint coding of texture and depth data. However, the concept is slightly different in that the depth map of a dependent view is not allowed to be utilized when coding the texture of the dependent view, i.e. the coding order is texture first for all views. Alternatively, the depth map of the base view can be used to perform view synthesis prediction in the dependent view, which requires some additional tricks since the corresponding areas of the two views are not co-located.

In addition, the 3D-HEVC development investigates development of more sophisticated and possibly simplified (lower complexity) depth map coding in the sub-Coded Tree Blocks (CTB) level of the core codec. This is motivated by the fact that the structure of depth maps significantly deviates from video texture, in that they usually show much more constancy (flat areas or gradual changes) and significant discontinuities at object edges. Therefore, specific coding tools (entitled as depth modeling modes—DMM) are defined, which allow to characterize the depth within a block by an edge (whose position could also be derived from the texture) and the depth values on both sides. Furthermore, not the whole depth range may be present in a given depth picture, which can be exploited by coding the depth via a depth lookup table (DLT).

Depth-Based Intra Prediction Mode Determination

The encoder and/or the decoder may determine an intra-prediction mode by using the depth information. The depth of the current texture block being coded or decoded may be compared to the depth of the neighboring texture blocks or boundary samples of the depth blocks co-located or corresponding to the neighboring texture blocks, and the intra prediction mode of the current texture block may be determined on the basis of this comparison. For example, if the depth of the current texture block is very similar to the depth of the boundary samples, a DC prediction may be inferred. In another example, a depth boundary is detected in the current depth block and a bi-directional intra prediction for the current texture block is inferred.

As the intra prediction mode may be inferred in the encoder and the decoder, no syntax element may be coded and bitrate may be reduced. The use of depth-based intra prediction mode determination may be signaled for example in the slice header and the encoder may turn a depth-based intra prediction mode on using rate-distortion optimized decision comparing a depth-based prediction mode determination and a conventional intra prediction mode determination and syntax element coding.

The intra prediction mode of the depth block may be used for intra prediction of the respective or co-located texture block (in both the encoder and decoder).

Similarly to block partitioning, there are multiple options for entropy coding of the intra prediction mode, including the following. The bi-directional intra prediction mode may be inferred when there is a depth boundary within the block, and otherwise conventional intra prediction may be used for the block, where encoder determines the intra prediction mode and indicates it in the bitstream. As the intra prediction mode is inferred in both the encoder and decoder, no syntax element is coded.

In another option, the intra prediction mode may be coded into the bitstream but the depth-based prediction of the intra prediction mode may be applied in both encoder and decoder to modify the context state of CABAC or context-based variable length coding or any similar entropy coding in such a manner that the intra prediction mode chosen by the depth-based algorithm may use a smaller amount of coded data bits. In effect, the likelihood of the intra prediction mode deduced by the depth-based algorithm may be increased in the entropy coding and decoding.

In yet another option the intra prediction mode may be coded into the bitstream but the code table or binarization table used in the intra prediction mode codeword may be dependent on the result of the depth-based algorithm.

The use of depth-based intra prediction mode determination may be signaled for example in the slice header, macroblock syntax, or block syntax and the encoder may turn it on using rate-distortion optimized decision comparing depth-based prediction mode determination and conventional intra prediction mode determination.

The encoder may, for example, perform conventional intra prediction mode selection e.g. using rate-distortion optimization. If the rate-distortion cost of conventional intra prediction is smaller than that of the depth-based intra prediction mode selection, the encoder may choose to use conventional intra prediction and indicate the use of the conventional intra prediction in the bitstream, for example in the slice header, macroblock syntax, or block syntax.

The decoder may decode the syntax element(s) related to the intra prediction mode and decode the bitstream using the indicated intra prediction mode and related syntax elements.

Many video encoders utilize the Lagrangian cost function to find rate-distortion optimal coding modes, for example the desired macroblock mode and associated motion vectors. This type of cost function uses a weighting factor or $\lambda$ to tie together the exact or estimated image distortion due to lossy coding methods and the exact or estimated amount of information required to represent the pixel/sample values in an image area. The Lagrangian cost function may be represented by the equation: $C=D+\lambda R$, where C is the Lagrangian cost to be minimised, D is the image distortion (for example, the mean-squared error between the pixel/sample values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

Complexity Simplification

In a HEVC-based three-dimensional (3D) video coding mechanism, DMM is utilized together with intra coding schemes of HEVC for intra coding of depth map. During a mode selection process, a full RD search list is created and several most probable modes (MPMs) (8 for 4×4 and 8×8 CU sizes, 3 for 16×16, 32×32, 64×64 CU sizes) are selected from 36 intra prediction modes for a full-RD cost calculation. After selection of several MPMs, e.g. 3 or 8 MPMs, all DMMs available are also added to the full-RD search list for a full-RD cost calculation. It is noted that each MPM may be associated with a probability to be selected as a final prediction mode for coding a depth block. A priority of the full RD search list thus is related with such probability.

In an exemplary HEVC-based depth intra coding mechanism, all available Depth Modelling Modes (DMMs) may be added to a full-rate distortion (RD) search list for full-RD cost calculation. Thus for a CU to be coded, a RD search list may be created to include several MPMs and DMMs, each of which may be associated with a RD cost calculation. The prediction mode with the minimum RD cost may be selected as the final prediction mode for coding the CU. It is observed that the mode decision process in this depth intra coding mechanism may be simplified. As disclosed in various embodiments, in many cases, DMM full-RD search may be skipped (e.g. RD cost calculation for DMMs may be skipped) since most coding units (CU) of a depth map are very flat or smooth, and DMMs are designed for CU with edge or sharp transition. Various embodiments are disclosed herein whose rationale may be applied to speed up mode decision process in a depth intra coding scenario. It is reported that 15% encoding time is saved for All-Intra test cases and almost no Bjøntegaard-Delta (BD) Rate difference is observed if such rationale is applied.

Depth maps are mainly characterized by sharp edges (which represent object borders) and large areas of nearly constant or slowly varying sample values (which represent object areas). While a draft HEVC intra prediction and transform coding may be well-suited for nearly constant regions, it may result in significant coding artifacts at sharp edges, which are visible in synthesized intermediate views. For a better representation of edges in depth maps, four new intra prediction modes (IPMs) for depth coding may be added. In all four modes, a depth block is approximated by a mode or model that partitions the area of the block into two non-rectangular regions, where each region is represented by a constant value. It is noted that a depth block includes but is by no means limited to a CU or a block of pixels or samples. The information required for such a mode or model comprises two elements, namely the partition information, specifying the region each sample belongs to, and the region value information, specifying a constant value for samples of the corresponding region. Such a region value is referred to as a constant partition value (CPV) in the following. Two different partition types may be used, namely Wedgelets and Contours, which differ in the way the segmentation of a depth block is derived. A depth modeling mode may be integrated as an alternative to conventional intra prediction modes specified in a draft HEVC. Similar as for intra prediction modes, a residual representing the difference between the approximation and the original depth signal can be transmitted via transform coding. In the following, the approximation of a depth block using the four new depth modeling modes (DMMs) is described in more detail.

These four DMMs are:
Mode 1: Explicit Wedgelet signaling;
Mode 2: Intra-predicted Wedgelet partitioning;
Mode 3: Inter-component-predicted Wedgelet partitioning;
Mode 4: Inter-component-predicted Contour partitioning.

In an encoding process of an embodiment, for a block, e.g. an intra-coded CU, one of the above described DMMs or one of the conventional IPMs may be selected. If a DMM is selected, the selected DMM and the associated prediction data may be signaled in a bitstream in addition to a syntax element that specifies the usage of a DMM. The aforementioned four DMMs may be described in following Table 1.

TABLE 1

| Mode 1: Explicit Wedgelet signaling | Wedgelet_ModelIntra: Intra modeling of Wedgelet block partition |
| Mode 2: Intra-predicted Wedgelet partitioning | Wedgelet_PredIntra: Intra prediction of Wedgelet block partition |
| Mode 3: Inter-component-predicted Wedgelet partitioning | Wedgelet_PredTexture: Inter-component prediction of Wedgelet block partition |
| Mode 4: Inter-component-predicted Contour partitioning | Contour_PredTexture: Inter-component prediction of Contour block partition |

In an exemplary embodiment, each of the four modes may be applied with or without delta CPVs, resulting in eight different mode_IDs for signaling a decoder. The decoder may decide, based on information conveyed by the encoder, which type of processing may be applied for prediction and reconstruction of the coded block.

It is observed that in many cases after a full-RD search, a DMM has less than 10% probability to be selected as the best mode. This is because most of the CUs in a depth map are flat or smooth, and DMMs are designed for CUs with edges or sharp transitions which is less efficient for smooth CU compression. Based on this observation, disclosed herein are various embodiments whose rationale may be applied to the use of a pre-selection process to early terminate the DMM full-RD cost calculation.

In accordance with an embodiment, a pre-selection based on the first mode in a full-RD cost calculation list (uiRdModeList[0]) is considered.

When the first mode in a full-RD cost calculation list is a planar mode (uiRdModeList[0]==0), the CU to be coded is very likely to be flat or smooth. Therefore, under this condition, all the DMMs full-RD cost calculation is skipped, i.e. no DMM is to be included in a RD search list for cost calculation.

In accordance with another embodiment, a refinement for DMM mode 1 without delta CPVs (DMM_WEDGE_FULL_IDX) and DMM mode3 with delta CPVs (DMM_WEDGE_PREDTEX_D_IDX) is considered.

Under the pre-selection condition in aforementioned embodiment, most unnecessary DMM full-RD cost calculations may be skipped. However, it is observed that some cases may still be missed when DMM should have been selected as the best mode under that condition. For those missed DMMs, DMM mode 1 without delta CPVs (DMM_WEDGE_FULL_IDX) and DMM mode 3 with delta CPVs (DMM_WEDGE_PREDTEX_D_IDX) may be the two most probable missed DMMs. For these two DMMs, when they are missed, it is observed that the second mode in a full-RD cost calculation list is very like to be DC (uiRdModeList[1]==1). Thus in the case that the first mode in a full-RD cost calculation list is a planar mode, and the second mode in the full-RD cost calculation list is a DC mode, DMM mode 1 without delta CPVs (DMM_WEDGE_FULL_IDX) and DMM mode 3 with delta CPVs (DMM_WEDGE_PREDTEX_D_IDX) may be added into the full-RD cost calculation list.

It is noted that in this disclosure, a full-RD search list and a full RD cost calculation list may be termed as the same concept.

Figure 2:
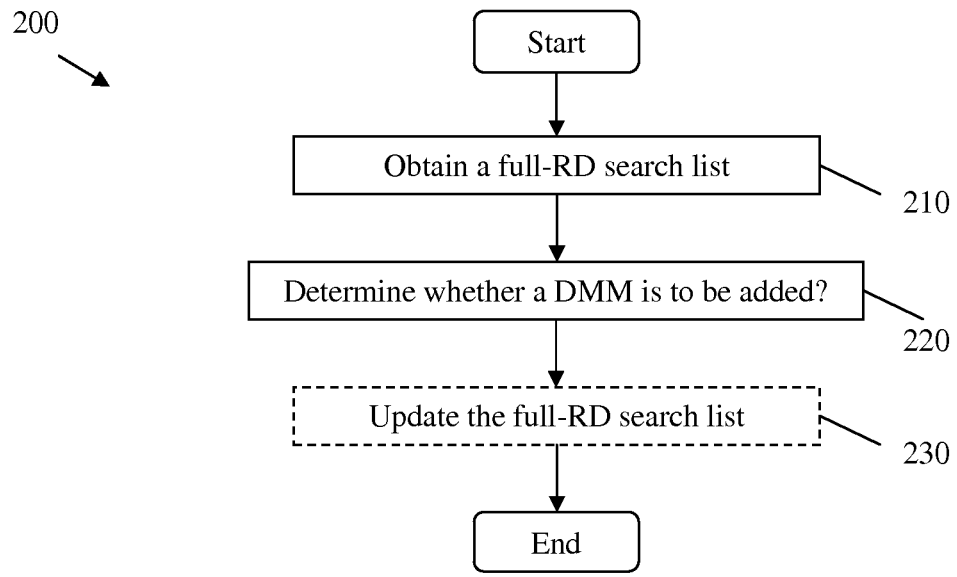
FIG. 2 illustrates an embodiment of a mode selection method.

FIG. 2 illustrates an embodiment of a mode selection method 200, which may be implemented on an encoding side comprising a video encoder (e.g. the video encoder 10). This method may be applied for depth intra coding.

In block 210, a full-RD search list is obtained before any DMM may be added into the full-RD search list. The full-RD search list may include an order list of coding modes, e.g. MPMs.

In block 220, a determination is made as to whether a DMM mode is to be added into the full-RD search list. It is noted that the determination may be based on a decision condition.

Optionally, in block 230, the full-RD search list may be updated in accordance with the determination result. In a case that at least one DMM is to be added, the at least one DMM may be added into the full-RD search list, i.e. the full-RD search list may be updated. It may be unnecessary to update the full-RD search list in the case that no DMM is to be added. It is noted that, the number of added DMMs may be less than the total number of all available DMMs. It is also noted that the full-RD search list, with or without any DMM added, may be utilized in a full RD cost calculation for depth intra coding.

Figure 3:
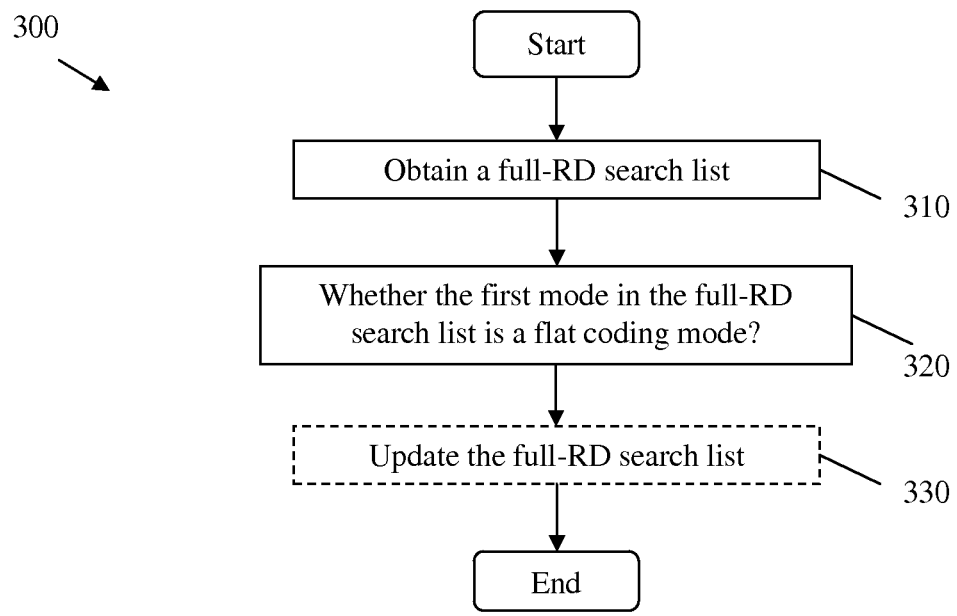
FIG. 3 illustrates another embodiment of a mode selection method.

FIG. 3 illustrates another embodiment of a mode selection method 300, which may be implemented on an encoding side comprising a video encoder (e.g. the video encoder 10). This method may be applied for depth intra coding.

In block 310, a full-RD search list is obtained before any DMM may be added into the full-RD search list.

In block 320, a determination is made as to whether a DMM mode is to be added into the full-RD search list. It is noted that the determination may be based on a decision condition.

In an exemplary embodiment, a decision condition may be based on whether the first mode in the full-RD search list is a flat coding mode (e.g. a planar mode, or a DC mode). A flat coding mode is a prediction mode which may be chosen to code a block which is lacking rich texture. For example, a planar mode is usually selected for coding a block in a flat region. A DC mode is usually selected for coding a block in a region lack of texture. In the case that the first mode in the full-RD search list is a flat coding mode, no DMM may be selected, i.e. no DMM may be added into the full-RD search list.

Optionally, in block 330, the full-RD search list may be updated in accordance with the determination result. In a case that at least one DMM is to be added, the at least one DMM may be added into the full-RD search list, i.e. the full-RD search list may be updated. In a case that no DMM is selected or added, the full-RD search list may not be updated.

It is noted that the full-RD search list, with or without any DMM added, may be utilized in a full RD cost calculation for depth intra coding.

Figure 4:
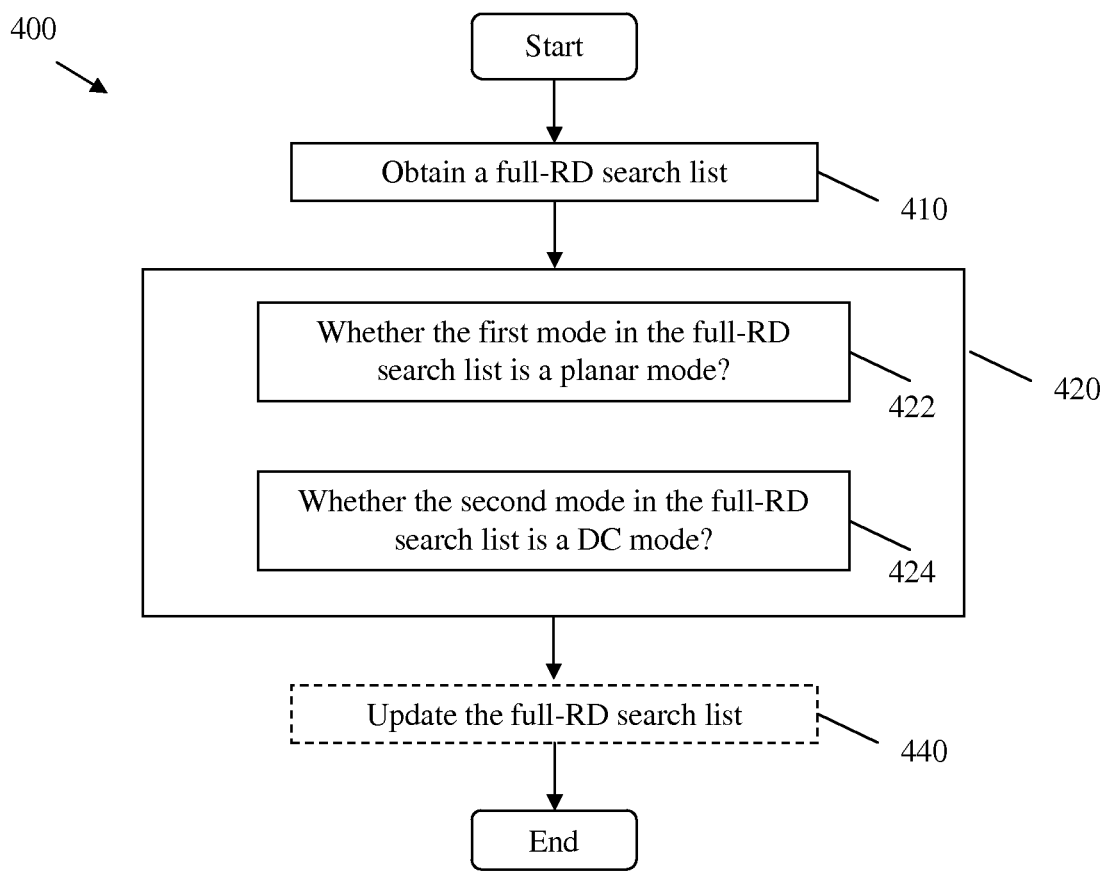
FIG. 4 illustrates another embodiment of a mode selection method.

FIG. 4 illustrates another embodiment of a mode selection method 400, which may be implemented on an encoding side comprising a video encoder (e.g. the video encoder 10). This method may be applied for depth intra coding.

In block 410, a full-RD search list is obtained before any DMM may be added into the full-RD search list.

In block 420, a determination is made as to whether a DMM mode is to be added into the full-RD search list. It is noted that the determination may be based on a decision condition.

In an exemplary embodiment, a decision condition may be based on whether the first mode in the full-RD search list is a planar mode, i.e. block 422. In the case that the first mode in the full-RD search list is a planar mode, no DMM may be selected, i.e. no DMM may be added into the full-RD search list. And no further determination may be needed. In the case that the first mode in the full-RD search list is not a planar mode, further determination may be needed, e.g. further determination of whether another mode in the full-RD search list is a specific DMM. In the case that the first mode in the full-RD search list is not a planar mode, at least one DMM may be added into the full-RD search list.

In an exemplary embodiment, in the case that the first mode in the full-RD search list is not a planar mode, a further determination is made as to whether the second mode in the full-RD search list is a DC mode, i.e. block 424. In the case that the second mode in the full-RD search list is a DC mode, at least one DMM may be added into the full-RD search list. In the case that the second mode in the full-RD search list is not a DC mode, at least another DMM may be added into the full-RD search list. It is noted that a DMM added into the full-RD search list in the case that the first mode in the full-RD search list is not a planar mode may be different than a DMM which is added into the full-RD search list in the case that the first mode in the full-RD search list is not a planar mode and the second mode in the full-RD search list is a DC mode. It is noted that a DMM added into the full-RD search list in the case that the second mode in the full-RD search list is a DC mode may be different than a DMM which is added into the full-RD search list in the case that the second mode in the full-RD search list is not a DC mode.

It is noted that block 422 and block 424 represent separate decision conditions. The implementation of these decision conditions may be in any order or combination of these separate decision conditions, e.g. from block 422 to block 424, or vice versa.

Optionally, in block 440, the full-RD search list may be updated in accordance with a determination result. In a case that at least one DMM is to be added, the at least one DMM may be added into the full-RD search list, i.e. the full-RD search list may be updated. In a case that no DMM is selected or added, the full-RD search list may not be updated.

It is noted that the full-RD search list, with or without any DMM added, may be utilized in a full RD cost calculation for depth intra coding.

Figure 5:
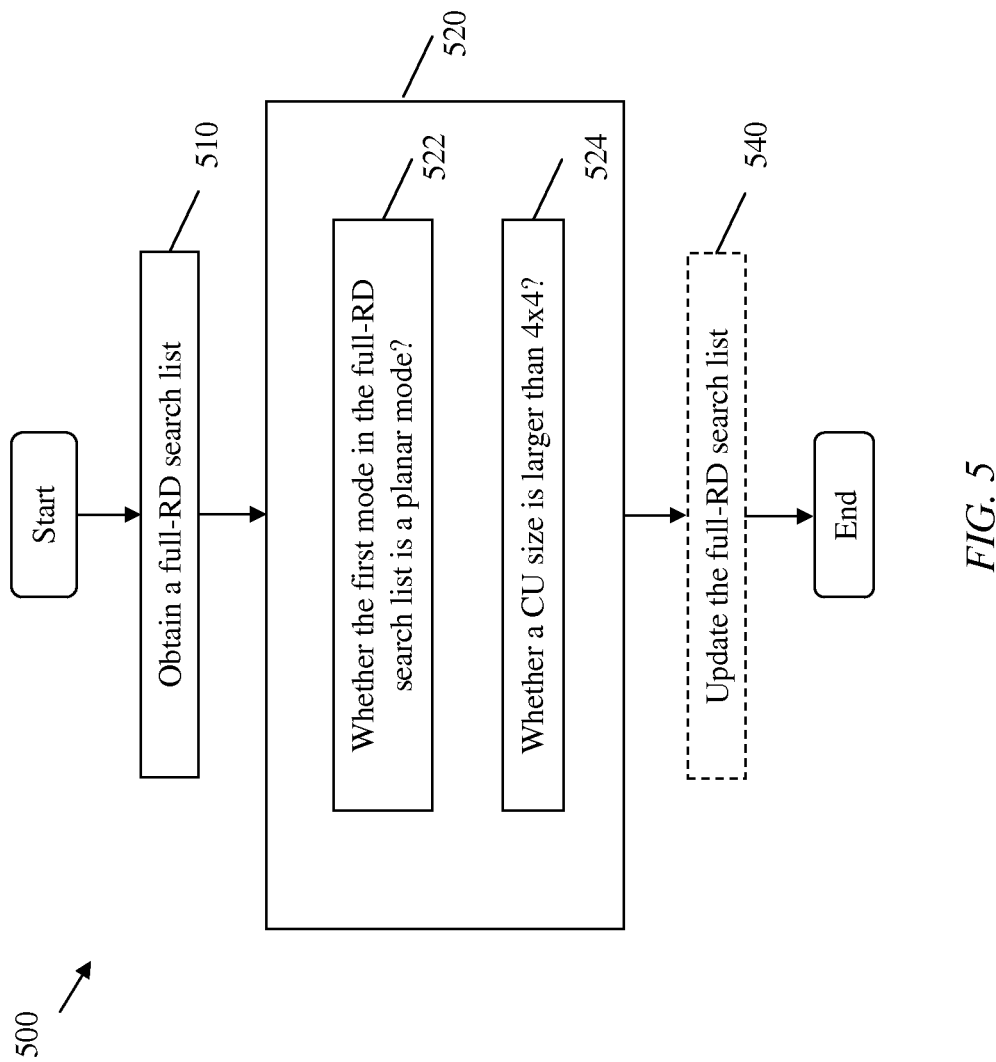
FIG. 5 illustrates another embodiment of a mode selection method.

FIG. 5 illustrates another embodiment of a mode selection method 500, which may be implemented on an encoding side comprising a video encoder (e.g. the video encoder 10). This method may be applied for depth intra coding.

In block 510, a full-RD search list is obtained before any DMM may be added into the full-RD search list.

In block 520, a determination is made as to whether a DMM mode is to be added into the full-RD search list. It is noted that the determination may be based on a decision condition.

In an exemplary embodiment, a decision condition may be based on whether the first mode in the full-RD search list is a planar mode, i.e. block 522. In the case that the first mode in the full-RD search list is a planar mode, no DMM may be selected, i.e. no DMM may be added into the full-RD search list. And no further determination may be needed. In the case that the first mode in the full-RD search list is not a planar mode, further determination may be needed, e.g. further determination of a CU size. In the case that the first mode in the full-RD search list is not a planar mode, at least one DMM may be added into the full-RD search list.

In an exemplary embodiment, in the case that the first mode in the full-RD search list is not a planar mode, a further determination is made as to whether a CU size is larger than 4×4, i.e. block 524. In the case that a CU size is larger than 4×4, at least one DMM may be added into the full-RD search list. In the case that a CU size is not larger than 4×4, at least another DMM may be added into the full-RD search list. It is noted that a DMM added into the full-RD search list in the case that the first mode in the full-RD search list is not a planar mode may be different than a DMM which is added into the full-RD search list in the case that the first mode in the full-RD search list is not a planar mode and a CU size is larger than 4×4. It is noted that a DMM added into the full-RD search list in the case that a CU size is larger than 4×4 may be different than a DMM which is added into the full-RD search list in the case that a CU size is not larger than 4×4.

It is noted that block 522 and block 524 represent separate decision conditions. The implementation of these decision conditions may be in any order or combination of these separate decision conditions, e.g. from block 522 to block 524, or vice versa.

Optionally, in block 540, the full-RD search list may be updated in accordance with a determination result. In a case that at least one DMM is to be added, the at least one DMM may be added into the full-RD search list, i.e. the full-RD search list may be updated. In a case that no DMM is selected or added, the full-RD search list may not be updated.

It is noted that the full-RD search list, with or without any DMM added, may be utilized in a full RD cost calculation for depth intra coding.

In another embodiment of a mode selection, a determination is made as to whether a DMM mode is to be added into the full-RD search list. It is noted that the determination may be based on a decision condition, e.g. whether a depth modeling mode option is enabled, whether a width of a CU is within the range of [4, 32], or whether a width of a CU is equal to a height of the CU. The depth modeling mode option may be associated with a syntax which stands for whether depth modeling mode mechanism is on or off, enabled or disabled, selected or not selected. Such an option may be represented by a flag. The depth modeling mode option is enabled may stand for that depth modeling modes capable of being used for depth block coding are allowed. No DMM may be added into the full-RD search list in the case of any one or any combination of the following conditions fulfill:

a depth modeling mode option is not enabled;
a width of a CU is not within the range of [4, 32];
a width of a CU is not equal to a height of the CU.

In an exemplary embodiment, in the case that the following conditions are fulfilled, i.e. a depth modeling mode option is enabled, a width of a CU is within the range of [4, 32], and a width of a CU is equal to a height of the CU, a further determination may be needed to determine whether a DMM may be added into the full-RD search list.

In an exemplary embodiment, in the case that the following conditions are not fulfilled, i.e. a depth modeling mode option is enabled, a width of a CU is within the range of [4, 32], and a width of a CU is equal to a height of the CU, no DMM may be added into the full-RD search list.

Optionally, the full-RD search list may be updated in accordance with the determination result.

In another embodiment of a mode selection, a determination is made as to whether a DMM mode is to be added into the full-RD search list. It is noted that the determination may be based on a decision condition, e.g. whether the first mode in the full-RD search list is a planar mode and/or whether the second mode in the full-RD search list is a DC mode. The decision condition may also include whether a depth modeling mode option is enabled, whether a width of a CU is within the range of [4, 32], or whether a width of a CU is equal to a height of the CU. At least one DMM may be added into the full-RD search list in the case that the first mode in the full-RD search list is not a planar mode and/or the second mode in the full-RD search list is a DC mode. The at least one DMM added into the full-RD search list may be a DMM mode 1 without a delta CPV and/or a DMM mode 3 with a delta CPV. Optionally, the full-RD search list may be updated in accordance with the determination result.

In an exemplary embodiment, in the case that the following conditions are fulfilled, i.e. a depth modeling mode option is enabled, a width of a CU is within the range of [4, 32], and a width of a CU is equal to a height of the CU, the first mode in the full-RD search list is not a planar mode, and the second mode in the full-RD search list is a DC mode, at least one DMM may be added into the full-RD search list. The at least one DMM added into the full-RD search list may be a DMM mode 1 without a delta CPV and/or a DMM mode 3 with a delta CPV.

In an exemplary embodiment, in the case that the following conditions are fulfilled, i.e. a depth modeling mode option is enabled, a width of a CU is within the range of [4, 32], and a width of a CU is equal to a height of the CU, and the first mode in the full-RD search list is not a planar mode or the second mode in the full-RD search list is a DC mode, at least one DMM may be added into the full-RD search list. The at least one DMM added into the full-RD search list may be a DMM mode 1 without a delta CPV and/or a DMM mode 3 with a delta CPV.

In another embodiment of a mode selection, a determination is made as to whether a DMM mode is to be added into the full-RD search list. It is noted that the determination may be based on a decision condition, e.g. whether the first mode in the full-RD search list is a planar mode. The decision condition may also include whether a depth modeling mode option is enabled, whether a width of a CU is within the range of [4, 32], or whether a width of a CU is equal to a height of the CU. At least one DMM may be added into the full-RD search list in the case that the first mode in the full-RD search list is not a planar mode. The at least one DMM added into the full-RD search list may be a DMM mode 1 with a delta CPV and/or a DMM mode 3 without a delta CPV. Optionally, the full-RD search list may be updated in accordance with the determination result.

In an exemplary embodiment, in the case that the following conditions are fulfilled, i.e. a depth modeling mode option is enabled, a width of a CU is within the range of [4, 32], a width of a CU is equal to a height of the CU, and the first mode in the full-RD search list is not a planar mode, at least one DMM may be added into the full-RD search list.

The at least one DMM added into the full-RD search list may be a DMM mode 1 with a delta CPV and/or a DMM mode 3 without a delta CPV.

In another embodiment of a mode selection, a determination is made as to whether a DMM mode is to be added into the full-RD search list. It is noted that the determination may be based on a decision condition, e.g. whether the first mode in the full-RD search list is a planar mode and a width of a CU is larger than 4. The decision condition may also include whether a depth modeling mode option is enabled, whether a width of a CU is within the range of [4, 32], or whether a width of a CU is equal to a height of the CU. At least one DMM may be added into the full-RD search list in the case that the first mode in the full-RD search list is not a planar mode and the width of a CU is larger than 4. The at least one DMM added into the full-RD search list may be a DMM mode 2 and/or a DMM mode 4. Optionally, the full-RD search list may be updated in accordance with the determination result.

In an exemplary embodiment, in the case that the following conditions are fulfilled, i.e. a depth modeling mode option is enabled, a width of a CU is within the range of [4, 32], a width of a CU is equal to a height of the CU, the first mode in the full-RD search list is not a planar mode, and the width of a CU is larger than 4, at least one DMM may be added into the full-RD search list. The at least one DMM added into the full-RD search list may be a DMM mode 2 and/or a DMM mode 4.

In another embodiment of a mode selection, a determination is made as to whether a DMM mode is to be added into the full-RD search list. It is noted that the determination may be based on a decision condition, e.g. by default, no DMM is added into the full-RD search list.

In an exemplary embodiment, in the case that the following conditions are fulfilled, i.e. a depth modeling mode option is enabled, a width of a CU is within the range of [4, 32], a width of a CU is equal to a height of the CU; by default no DMM is added into the full-RD search list.

Other embodiments of a decision condition as to whether a DMM may be added into a full RD-search list are exemplarily summarized in the Table illustrated in FIG. 6.

FIG. 7 illustrates an experimental result of an application of the rationale of the mode selection method described above.

It is noted that, DMM modes for depth intra coding may significantly improve the coding efficiency in terms of bit saving compared with conventional intra prediction modes. However, the additional DMM modes also incur considerable additional computation and encoding time compared with a conventional design without DMM. It is desirable yet challenging to reduce the computation without hurting performance gain introduced by DMM modes. In this disclosure, as exemplified by FIG. 7, embodiments disclosed herein may successfully achieve almost 15% encoding time reduction with negligible performance loss, i.e. 0.1%-0.2%.

It is noted that following new features lie in various embodiments of this disclosure:

1. Instead of adding all available DMM modes to a full-RD cost calculation list for best mode selection, one or several pre-selection conditions is introduced so that a DMM mode is added to the full-RD cost calculation list only when one or several of these conditions are met. In this way, encoding time may be reduced with negligible performance loss.

2. These conditions may be applied in any combination so that tradeoff may be achieved between encoding time saving and performance loss. Such a flexible design may make selection of DMM adaptive to complexity constraint, which is a considerable new feature compared with a conventional design.

At least some of the features, methods, or codecs, such as the methods described in aforementioned embodiments may be implemented on any general-purpose electronic device, such as a computer system or component electronic apparatus with sufficient processing power, memory resources, and network throughput capability to handle the necessary workload placed upon it. The electronic device may for example be a mobile terminal or user equipment of a wireless communication system. However, it would be appreciated that embodiments of the disclosure may be implemented within any electronic device or apparatus which may require encoding and decoding or encoding or decoding video images.

Figure 8:
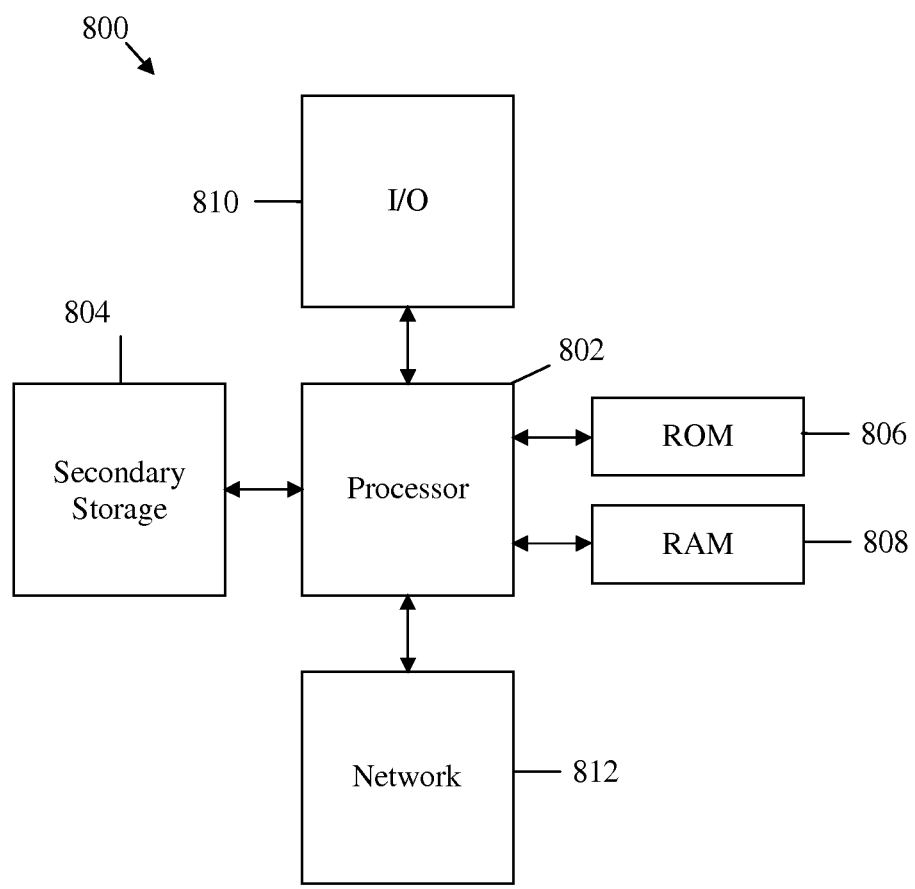
FIG. 8 is a schematic diagram of an embodiment of an electronic device.

FIG. 8 illustrates a typical, general-purpose electronic device 800 suitable for implementing one or more embodiments of the components disclosed herein. The general-purpose electronic device 800 includes a processor 802 (which may be referred to as a central processing unit or CPU) that is in communication with memory devices including secondary storage 804, read only memory (ROM) 806, random access memory (RAM) 808, input/output (I/O) devices 810, and optionally a network connectivity devices 812. The processor 802 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 802 may be configured to implement any of the embodiments of a mode selection aforementioned. The processor 802 may be implemented using hardware or a combination of hardware and software.

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

The network connectivity devices 812 may serve as an output and/or input device of electronic device 800. The network connectivity devices 812 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 812 may enable the processor 802 to communicate with an Internet and/or one or more intranets and/or one or more client devices. I/O devices 810 may include a video monitor, liquid crystal display (LCD), touch screen display, or other type of video display for displaying video, and/or may include a video recording device for capturing video. I/O devices 810 may also include one or more keyboards, mice, or track balls, or other well-known input devices.

It is understood that by programming and/or loading executable instructions onto the electronic device 800, at least one of the processor 802, the ROM 806, and the RAM 808 are changed, transforming the computer system 800 in part into a particular machine or apparatus, e.g., an HEVC codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

In the following some examples will be provided.

According to a first example there is provided a method of prediction mode selection for coding a block of a depth map, the method comprises:

obtaining an ordered list of coding modes, wherein the ordered list of coding modes comprises a plurality of coding modes each of which is capable of being used for coding of the block;

obtaining a plurality of depth modeling modes (DMMs) each of which is capable of being used for coding of the block; and determining whether a DMM of the plurality of DMMs is to be added into the ordered list of coding modes in accordance with a decision condition.

In some embodiments, the DMM is added into the ordered list of coding modes in the case that determination is made to add the DMM to the ordered list of coding modes.

In some embodiments, the ordered list of coding modes is used for coding of the block after the determining step.

In some embodiments, the decision condition is based on any one or any combination of the following:

at least one coding mode of the ordered list of coding modes;

a mode capable of being used for coding of a depth block;

a size information of the block;

an order of the ordered list of coding modes; and a depth modeling mode enable/disable option.

In some embodiments, the decision condition is based on a checking of the priority of the ordered list of coding modes.

In some embodiments, the decision condition is based on a checking of the first and/or the second mode in the ordered list of coding modes.

In some embodiments, the decision condition is based on a checking of whether the first and/or the second mode in the ordered list of coding modes is a flat coding mode.

In some embodiments, in the case that the first and/or the second coding mode in the ordered list of coding modes is a flat coding mode, the DMM is excluded to be added into the ordered list of coding modes.

In some embodiments, the flat coding mode is any of the following: a planar mode, and a DC mode.

In some embodiments, the decision condition is based on whether the first mode in the ordered list of coding modes is a planar mode.

In some embodiments, in the case that the first mode in the ordered list of coding modes is a planar mode, the DMM is excluded to be added into the ordered list of coding modes.

In some embodiments, the decision condition is based on whether the second mode in the ordered list of coding modes is a DC mode.

In some embodiments, in the case that the second mode in the ordered list of coding modes is a DC mode, the DMM is excluded to be added into the ordered list of coding modes.

In some embodiments, the decision condition is based on whether a depth modeling mode option is enabled.

In some embodiments, the size information of the block comprises any one or any combination of the following: a range of the size of the block, and a width and/or a height of the block.

In some embodiments, the range of the size of the block is [4, 32].

In some embodiments, the width of the block is equal to the height of the block.

In some embodiments, the ordered list of coding modes is updated in the case that the DMM is added into the ordered list of coding modes.

In some embodiments, the ordered list of coding modes is not updated in the case that the DMM is not added into the ordered list of coding modes, and depth modeling mode coding is excluded to be capable of being used for coding of the block.

In some embodiments, the method further comprises:
calculating a rate-distortion cost for each entry in the ordered list of coding modes after the determining step.

In some embodiments, the method further comprises:
selecting a coding mode from the ordered list of coding modes with a minimum calculated rate-distortion cost, wherein the selected coding mode with the minimum calculated rate-distortion cost is applied for coding of the block.

In some embodiments, the plurality of coding modes in the ordered list of coding modes includes a plurality of most probable modes (MPMs).

In some embodiments, each of the MPMs is selected from a plurality of intra prediction modes (IPMs), each of the plurality of IPMs being capable of being used for coding of the block.

In some embodiments, the MPMs comprise at least one of the following: a planar mode, a DC mode, and a directional intra prediction mode.

In some embodiments, in the case that the DMM is added into the ordered list of coding modes, the DMM is added in any of the following ways:
the DMM is added after a plurality of MPMs in the ordered list of coding modes,
the DMM is added after the last entry of the ordered list of coding modes, and
the DMM is inserted between two entries of a plurality of MPMs in the ordered list of coding modes.

In some embodiments, the plurality of DMMs comprises at least one of the following: Wedgelet_ModelIntra mode, Wedgelet_PredIntra mode, Wedgelet_PredTexture mode, and Contour_PredTexture mode.

In some embodiments, the DMM is associated with a constant partition value (CPV).

In some embodiments, the plurality of coding modes in the ordered list of coding modes includes 3 or 8 MPMs.

According to a second example there is provided an apparatus comprising at least one processor and at least one memory including computer program code, the at least one memory and the computer program code configured to, with the at least one processor, cause the apparatus to:
obtain an ordered list of coding modes, wherein the ordered list of coding modes comprises a plurality of coding modes each of which is capable of being used for coding of a block of a depth map;
obtain a plurality of depth modeling modes (DMMs) each of which is capable of being used for coding of the block; and
determine whether a DMM of the plurality of DMMs is to be added into the ordered list of coding modes in accordance with a decision condition.

In some embodiments, the DMM is added into the ordered list of coding modes in the case that determination is made to add the DMM to the ordered list of coding modes.

In some embodiments, the ordered list of coding modes is used for coding of the block after the determination of whether the DMM is to be added into the ordered list of coding modes.

In some embodiments, the decision condition is based on any one or any combination of the following:
at least one coding mode of the ordered list of coding modes;
a mode capable of being used for coding of a depth block;
a size information of the block;
an order of the ordered list of coding modes; and
a depth modeling mode enable/disable option.

In some embodiments, the decision condition is based on a checking of the priority of the ordered list of coding modes.

In some embodiments, the decision condition is based on a checking of the first and/or the second mode in the ordered list of coding modes.

In some embodiments, the decision condition is based on a checking of whether the first and/or the second mode in the ordered list of coding modes is a flat coding mode.

In some embodiments, in the case that the first and/or the second coding mode in the ordered list of coding modes is a flat coding mode, the DMM is excluded to be added into the ordered list of coding modes.

In some embodiments, the flat coding mode is any of the following: a planar mode, and a DC mode.

In some embodiments, the decision condition is based on whether the first mode in the ordered list of coding modes is a planar mode.

In some embodiments, in the case that the first mode in the ordered list of coding modes is a planar mode, the DMM is excluded to be added into the ordered list of coding modes.

In some embodiments, the decision condition is based on whether the second mode in the ordered list of coding modes is a DC mode.

In some embodiments, in the case that the second mode in the ordered list of coding modes is a DC mode, the DMM is excluded to be added into the ordered list of coding modes.

In some embodiments, the decision condition is based on whether a depth modeling mode option is enabled.

In some embodiments, the size information of the block comprises any one or any combination of the following: a range of the size of the block, and a width and/or a height of the block.

In some embodiments, the range of the size of the block is [4, 32].

In some embodiments, the width of the block is equal to the height of the block.

In some embodiments, the ordered list of coding modes is updated in the case that the DMM is added into the ordered list of coding modes.

In some embodiments, the ordered list of coding modes is not updated in the case that the DMM is not added into the ordered list of coding modes, and depth modeling mode coding is excluded to be capable of being used for coding of the block.

In some embodiments, the apparatus is further caused to:
calculate a rate-distortion cost for each entry in the ordered list of coding modes after the determining step.

In some embodiments, the apparatus is further caused to:
select a coding mode from the ordered list of coding modes with a minimum calculated rate-distortion cost, wherein the selected coding mode with the minimum calculated rate-distortion cost is applied for coding of the block.

In some embodiments, the plurality of coding modes in the ordered list of coding modes includes a plurality of most probable modes (MPMs).

In some embodiments, each of the MPMs is selected from a plurality of intra prediction modes (IPMs), each of the plurality of IPMs being capable of being used for coding of the block.

In some embodiments, the MPMs comprise at least one of the following: a planar mode, a DC mode, and a directional intra prediction mode.

In some embodiments, in the case that the DMM is added into the ordered list of coding modes, the DMM is added in any of the following ways:
the DMM is added after a plurality of MPMs in the ordered list of coding modes,
the DMM is added after the last entry of the ordered list of coding modes, and
the DMM is inserted between two entries of a plurality of MPMs in the ordered list of coding modes.

In some embodiments, the plurality of DMMs comprises at least one of the following: Wedgelet_ModelIntra mode, Wedgelet_PredIntra mode, Wedgelet_PredTexture mode, and Contour_PredTexture mode.

In some embodiments, the DMM is associated with a constant partition value (CPV).

In some embodiments, the plurality of coding modes in the ordered list of coding modes includes 3 or 8 MPMs.

According to a second example there is provided an apparatus, comprising:
means for obtaining an ordered list of coding modes, wherein the ordered list of coding modes comprises a plurality of coding modes each of which is capable of being used for coding of a block of a depth map;
means for obtaining a plurality of depth modeling modes (DMMs) each of which is capable of being used for coding of the block; and
means for determining whether a DMM of the plurality of DMMs is to be added into the ordered list of coding modes in accordance with a decision condition.

In some embodiments, the DMM is added into the ordered list of coding modes in the case that determination is made to add the DMM to the ordered list of coding modes.

In some embodiments, the ordered list of coding modes is used for coding of the block after the determination of whether the DMM is to be added into the ordered list of coding modes.

In some embodiments, the decision condition is based on any one or any combination of the following:
at least one coding mode of the ordered list of coding modes;
a mode capable of being used for coding of a depth block;
a size information of the block;
an order of the ordered list of coding modes; and
a depth modeling mode enable/disable option.

In some embodiments, the decision condition is based on a checking of the priority of the ordered list of coding modes.

In some embodiments, the decision condition is based on a checking of the first and/or the second mode in the ordered list of coding modes.

In some embodiments, the decision condition is based on a checking of whether the first and/or the second mode in the ordered list of coding modes is a flat coding mode.

In some embodiments, in the case that the first and/or the second coding mode in the ordered list of coding modes is a flat coding mode, the DMM is excluded to be added into the ordered list of coding modes.

In some embodiments, the flat coding mode is any of the following: a planar mode, and a DC mode.

In some embodiments, the decision condition is based on whether the first mode in the ordered list of coding modes is a planar mode.

In some embodiments, in the case that the first mode in the ordered list of coding modes is a planar mode, the DMM is excluded to be added into the ordered list of coding modes.

In some embodiments, the decision condition is based on whether the second mode in the ordered list of coding modes is a DC mode.

In some embodiments, in the case that the second mode in the ordered list of coding modes is a DC mode, the DMM is excluded to be added into the ordered list of coding modes.

In some embodiments, the decision condition is based on whether a depth modeling mode option is enabled.

In some embodiments, the size information of the block comprises any one or any combination of the following: a range of the size of the block, and a width and/or a height of the block.

In some embodiments, the range of the size of the block is [4, 32].

In some embodiments, the width of the block is equal to the height of the block.

In some embodiments, the ordered list of coding modes is updated in the case that the DMM is added into the ordered list of coding modes.

In some embodiments, the ordered list of coding modes is not updated in the case that the DMM is not added into the ordered list of coding modes, and depth modeling mode coding is excluded to be capable of being used for coding of the block.

In some embodiments, the apparatus further comprises:
means for calculating a rate-distortion cost for each entry in the ordered list of coding modes after the determining step.

In some embodiments, the apparatus further comprises:
means for selecting a coding mode from the ordered list of coding modes with a minimum calculated rate-distortion cost, wherein the selected coding mode with the minimum calculated rate-distortion cost is applied for coding of the block.

In some embodiments, the plurality of coding modes in the ordered list of coding modes includes a plurality of most probable modes (MPMs).

In some embodiments, each of the MPMs is selected from a plurality of intra prediction modes (IPMs), each of the plurality of IPMs being capable of being used for coding of the block.

In some embodiments, the MPMs comprise at least one of the following: a planar mode, a DC mode, and a directional intra prediction mode.

In some embodiments, in the case that the DMM is added into the ordered list of coding modes, the DMM is added in any of the following ways:
the DMM is added after a plurality of MPMs in the ordered list of coding modes,
the DMM is added after the last entry of the ordered list of coding modes, and
the DMM is inserted between two entries of a plurality of MPMs in the ordered list of coding modes.

In some embodiments, the plurality of DMMs comprises at least one of the following: Wedgelet_ModelIntra mode, Wedgelet_PredIntra mode, Wedgelet_PredTexture mode, and Contour_PredTexture mode.

In some embodiments, the DMM is associated with a constant partition value (CPV).

In some embodiments, the plurality of coding modes in the ordered list of coding modes includes 3 or 8 MPMs.

In the above, some embodiments may be related to coding/decoding methods or tools having inter-component dependency, such as depth-based texture coding/decoding or prediction tools. It needs to be understood that embodiments may not be specific to the described coding/decoding methods but could be realized with any similar coding/decoding methods or tools.

In the above, example embodiments may be described with the help of syntax of the bitstream. It needs to be understood, however, that the corresponding structure and/or computer program may reside at the encoder for generating the bitstream and/or at the decoder for decoding the bitstream. Likewise, where the example embodiments may be described with reference to an encoder, it needs to be understood that the resulting bitstream and the decoder have corresponding elements in them. Likewise, where the example embodiments may be described with reference to a decoder, it needs to be understood that the encoder has structure and/or computer program for generating the bitstream to be decoded by the decoder.

What is claimed is:

1. A method for a pre-selection process in encoding a block of depth data for a video frame, comprising:
obtaining a list including one or more depth data coding modes;
updating the list with at least one or more Depth Modeling Modes (DMMs);
selecting one or more depth data coding modes from the list to encode the block of depth data for the video frame; and
encoding at least one block of depth data for a video frame according to the selection of the one or more depth data coding modes;
when a first mode in the list of the one or more depth data coding modes is not a planar coding mode, and a second mode in the list of the one or more depth data coding modes is a DC mode, adding the one or more DMMs into the list;
when a first mode in the list of the one or more depth data coding modes is a planar coding mode, and a size of a Coding Unit (CU) is larger than 4×4, adding the one or more DMMs into the list, wherein the block of the depth data comprises one or more CUs;
when a first mode in the list of the one or more depth data coding modes is a planar coding mode, adding the one or more DMMs into the list when a second mode in the list of the one or more depth data coding modes is a DC mode; and
adding a different one or more DMMs into the list when the second mode in the list of the one or more depth data coding modes is not a DC mode.

2. The method of claim 1, further comprising:
not updating the list when not adding the one or more DMMs into the list.

3. The method of claim 1, further comprising:
skipping cost calculation of the list in the encoding process of the depth data when the list being not updated.

4. The method of claim 1, further comprising:
when a first mode in the list of the one or more depth data coding modes is a flat coding mode, adding the one or more DMMs into the list, wherein the flat coding mode comprises a planar mode or a DC mode.

5. The method of claim 1, further comprising:
when a first mode in the list of the one or more depth data coding modes is a planar mode, the one or more DMMs not being added into the list.

6. An apparatus of performing a pre-selection process in encoding a block of depth data for a video frame, comprising:
a memory comprising a plurality of instructions; and a processor being coupled to the memory and executing the instructions to:
obtain a list including one or more depth data coding modes;
update the list with at least one or more Depth Modeling Modes (DMMs);
select one or more depth data coding modes from the list to encode the block of depth data for the video frame; and
encode at least one block of depth data for a video frame according to the selection of the one or more depth data coding modes;
wherein the processor further executes the instructions to add the one or more DMMs into the list when a first mode in the list of the one or more depth data coding modes is not a planar coding mode and a second mode in the list of the one or more depth data coding modes is a DC mode;
wherein the processor further executes the instructions to add the one or more DMMs into the list when a first mode in the list of the one or more depth data coding modes is a planar coding mode and a size of a Coding Unit (CU) is larger than 4×4, wherein the block of the depth data comprises one or more CUs;
wherein the processor further executes the instructions to add the one or more DMMs into the list when a first mode in the list of the one or more depth data coding modes is a planar coding mode and when a second mode in the list of the one or more depth data coding modes is a DC mode; and adding a different one or more DMMs into the list when a first mode in the list of the one or more depth data coding modes is a planar coding mode and when the second mode in the list of the one or more depth data coding modes is not a DC mode.

7. The apparatus of claim 6, wherein the processor further executes the instructions not to update the list when the one or more DMMs are not added into the list.

8. The apparatus of claim 6, wherein the processor further executes the instructions to skip cost calculation of the list in the encoding process of the depth data when the list is not updated.

9. The apparatus of claim 6, wherein the processor further executes the instructions to add the one or more DMMs into the list when a first mode in the list of the one or more depth data coding modes is a flat coding mode, wherein the flat coding mode comprises a planar mode or a DC mode.

10. The apparatus of claim 6, wherein the processor further executes the instructions not to add the one or more DMMs into the list when a first mode in the list of the one or more depth data coding modes is a planar mode.

11. An encoder encoding a block of depth data for a video frame, wherein the encoder comprises one or more prediction units (PUs) performing a prediction mode selection in the encoding process for the encoder, and the one or more PUs are configured to:

obtain a list including one or more depth data coding modes, the coding modes being used to code a block of depth data for a video frame;

update the list with at least one or more Depth Modeling Modes (DMMs); select one or more depth data coding modes from the list to encode the block of depth data for the video frame; and encode at least one block of depth data for a video frame according to the selection of the one or more depth data coding modes;

wherein the one or more PUs are further configured to add the one or more DMMs into the list when a first mode in the list of the one or more depth data coding modes is not a planar coding mode and a second mode in the list of the one or more depth data coding modes is a DC mode;

wherein the one or more PUs are further configured to add the one or more DMMs into the list when a first mode in the list of the one or more depth data coding modes is a planar coding mode and a size of a Coding Unit (CU) is larger than 4×4, wherein the block of the depth data comprises one or more CUs; and wherein the one or more PUs are further configured to add the one or more DMMs into the list when a first mode in the list of the one or more depth data coding modes is a planar coding mode and when a second mode in the list of the one or more depth data coding modes is a DC mode; and adding a different one or more DMMs into the list when a first mode in the list of the one or more depth data coding modes is a planar coding mode and when the second mode in the list of the one or more depth data coding modes is not a DC mode.

12. The encoder of claim 11, wherein the one or more PUs are further configured not to update the list when the one or more DMMs are not added into the list.

13. The encoder of claim 11, wherein the one or more PUs are further configured to skip cost calculation of the list in the encoding process of the depth data when the list is not updated.

14. The encoder of claim 11, wherein the one or more PUs are further configured to add the one or more DMMs into the list when a first mode in the list of the one or more depth data coding modes is a flat coding mode, wherein the flat coding mode comprises a planar mode or a DC mode.

15. The encoder of claim 11, wherein the one or more PUs are further configured not to add the one or more DMMs into the list when a first mode in the list of the one or more depth data coding modes is a planar mode.

* * * * *